(12) United States Patent
Gauss

(10) Patent No.: US 8,863,804 B2
(45) Date of Patent: Oct. 21, 2014

(54) DEVICE FOR COATING A WORKPIECE

(75) Inventor: Achim Gauss, Dornstetten (DE)

(73) Assignee: Homag Holzbearbeitungssysteme AG, Schopfloch (DE)

( * ) Notice: Subject to any disclaimer, the term of this patent is extended or adjusted under 35 U.S.C. 154(b) by 8 days.

(21) Appl. No.: 13/245,895

(22) Filed: Sep. 27, 2011

(65) Prior Publication Data

US 2012/0073748 A1 Mar. 29, 2012

(30) Foreign Application Priority Data

Sep. 27, 2010 (EP) .................................. 10180222

(51) Int. Cl.
*B32B 37/10* (2006.01)
*B29C 65/00* (2006.01)
*B29C 65/18* (2006.01)
*B27D 5/00* (2006.01)

(52) U.S. Cl.
CPC ............... *B27D 5/003* (2013.01); *B29C 66/96* (2013.01); *B29C 66/91* (2013.01); *B29C 65/18* (2013.01); *B29C 66/0342* (2013.01)
USPC ............................ 156/498; 156/547; 156/578

(58) Field of Classification Search
CPC .... B29C 65/18; B29C 66/0342; B29C 66/91; B29C 66/96
USPC ......................................... 156/498, 547, 578
See application file for complete search history.

(56) References Cited

U.S. PATENT DOCUMENTS

| | | | |
|---|---|---|---|
| 4,076,569 A | 2/1978 | Buchbinder | |
| 5,411,625 A * | 5/1995 | Focke et al. | 156/555 |
| 6,176,286 B1 * | 1/2001 | Kitagawa et al. | 156/555 |
| 6,382,100 B1 * | 5/2002 | Satoh et al. | 101/212 |
| 6,485,402 B1 * | 11/2002 | Bauer | 156/499 |
| 2007/0131335 A1 * | 6/2007 | Zhou et al. | 156/73.1 |
| 2007/0193692 A1 * | 8/2007 | Arafat et al. | 156/552 |
| 2008/0314512 A1 * | 12/2008 | Bartsch | 156/258 |

FOREIGN PATENT DOCUMENTS

| | | |
|---|---|---|
| DE | 2833052 A1 | 2/1980 |
| DE | 202009009253 U1 | 12/2009 |
| DE | 202008015878 U1 | 5/2010 |
| EP | 0169188 A2 | 1/1986 |
| EP | 1800813 A2 | 6/2007 |

(Continued)

OTHER PUBLICATIONS

Priority EP application Search Report dated Mar. 17, 2011.

(Continued)

*Primary Examiner* — Philip Tucker
*Assistant Examiner* — John Blades
(74) *Attorney, Agent, or Firm* — Harness, Dickey & Pierce, PLC

(57) ABSTRACT

The present invention provides a device for coating a workpiece, which comprises at least a deflector means for feeding a material web, downstream of which a pressure means for applying the material web to workpiece surface is arranged, wherein preferred pressure and deflector means comprise cylinders, rollers and/or shoes, wherein the device further comprises at least an energy source, the point of action of which lies in the region of the pressure means, in particular in a region of the pressure means which contacts the material web at least in portions. The device is configured to apply the material web onto the workpiece surface in the inline and/or offline method.

9 Claims, 2 Drawing Sheets

(56) References Cited

FOREIGN PATENT DOCUMENTS

| | | |
|---|---|---|
| EP | 2191947 A1 | 6/2010 |
| EP | 2433769 B1 | 4/2013 |
| GB | 1102079 | 2/1968 |

OTHER PUBLICATIONS

DE-Z Laminat-Magazine 2003, p. 78-79.
English translation of arguments of opponent against claim 1 on the basis of DE 2833052A1, (2014).

* cited by examiner

DEVICE FOR COATING A WORKPIECE

TECHNICAL FIELD

The present invention concerns a method and a device for coating a workpiece.

PRIOR ART

In surface finishing, in particular of plate-shaped workpieces for the furniture industry, a method is known in which material webs, in particular decorative paper, is in advance coated with glue outside of a coating facility and technologically treated in such manner that it is possible to store it in wound-up state over extended periods of time or to directly assemble it on a cutting machine.

In this method, a technical effort is given by the necessary cooling of the adhesive coating to below the reaction temperature in order to avoid that the adhesive binds to the underlying coating material side when rolling-up the coating film (blocking). Due to the necessary cooling lines, aggregates or machines for this method have very large dimensions.

Additionally there is the problem that the coating film provided with the adhesive can be guided along a certain section only on the side facing away from the adhesive, or that its direction can only be changed through deflecting rollers. Due to the residual adhesiveness of conventional adhesives, at low temperatures there is also the danger of damaging the adhesive film, too, if guiding elements or rollers touch the coating side.

Moreover, this technology causes problems for the user under energy and environmental aspects. To be specific, first the hot-melt adhesive has to be melted under large heat input to be then applied in its hot state by means of a heated applicator nozzle. Subsequently, the adhesive film is cooled down as fast as possible to below the reaction temperature and under considerable expense of energy in order to be able to roll up the coating film or to assemble it on cutting devices. Often temperature intervals of up to 150° C. occur in this process.

There is the further problem that commercially available EVA-adhesives still have a certain residual adhesiveness even at temperatures of 25 to 50° C. and so require cooling back to below this temperature. A residual danger of blocking is nevertheless given, in particular at high storage temperatures.

In the known art of surface coating in the furniture industry, the quantities of adhesive applied usually range from 50 to 60 g/m². Lower applied quantities very often result in quality draw-backs of the adhesive films.

SUMMARY OF THE INVENTION

It is therefore an object of the present invention to provide a method and a device for coating a workpiece with material webs, which makes it possible to conveniently handle material webs shortly after providing them with adhesive and prepare them for application onto a workpiece. The device should be technically simple and compact.

According to the invention this object is achieved by means of a device and a method for coating a workpiece having the features of the independent patent claims. Advantageous embodiments and improvements of the invention are defined in the dependent claims.

An inventive device for coating a workpiece comprises at least a deflector means for feeding a material web, downstream of which a pressure means for applying the material web onto the surface of the workpiece is arranged. The pressure and deflector means are preferably cylinders or rollers, but may also be configured as shoes or the like.

The device further comprises at least an energy source whose point of action is located in the area of the pressure means, in particular in an area of the pressure means, which is at least in sections in contact with the material web. Through the point of action energy is provided into the material web. This serves for activating the adhesive which is provided on the material web. When the material web with the activated adhesive is subsequently applied onto the workpiece surface by means of the pressure means, the material web can be glued to the workpiece and thus be fixed on the workpiece. An advantage of the device is given by the circumstance that it is possible to employ a material layer which as such is not adhesive and which can be rolled up without sticking together. Before activating the adhesive the material web is, therefore, easy to deflect, for example by means of rollers, without adhering. The adhesive is preferably a layer on the material web, but may also be a component of the material web.

Within the framework of the invention the material web may for example be provided endless or in form of sections. Further, within the framework of the invention the material layer may for example be provided as a two-dimensional element or as (edge) strip.

In a further inventive device for coating a workpiece with a material web, an adhesive applicator advice, at least one energy source and a pressure means for applying the material web onto a workpiece surface are arranged along the material web. Here, the at least one energy source is configured to control the temperature of an adhesive layer applied by the adhesive applicator device at least in portions between the adhesive applicator device and the pressure means.

This so-called inline method has an advantage over the offline method in that the adhesive layer present on the material web remains activated from its application onto the material web until the application of the material web onto the workpiece and, thus, the overall necessary energy input is markedly reduced. This allows, in a more simple way, a higher production speed than for example the offline method which will be explained in more detail below. A further advantage of this inventive embodiment is that the pressure means may be configured to have a simpler structure since additional devices such as energy sources in form of heaters can be omitted. Preferred pressure means are cylinders, rollers and/or shoes.

Further, with a suitable placement of the adhesive applicator device it is possible to integrate merely one energy source into the pressure means without necessitating further energy sources for activating the adhesive layer or keeping it activated. The energy source is preferably configured so as to heat the adhesive layer to a temperature of 100° C. to 250° C. It is further preferred that the adhesive applicator device applies amounts of adhesive of less than 50 g/m², most preferably less than 30 g/m². In addition, in the present embodiment there may be provided at least a deflector means in order to feed the material web to the workpiece surface. Here, it is quite possible to use the pressure means also as deflector means.

In a further preferred embodiment of the device for coating a workpiece surface, at least two pressure means are arranged in series and are configured to apply the material web onto the workpiece surface. Here, the pressure means are preferably heated, and most preferably with temperatures increasing in the application direction. In other words, the first contact between the material web and the workpiece surface occurs at the first pressure means with a first temperature, followed by the at least one further pressure element with a second temperature that is preferably higher than the first temperature. Moreover, with a corresponding configuration of the pressure means it is possible to control the temperature and/or the pressure of each of the rollers in order to obtain as far as possible an optimized coating result. In any case, in this embodiment the material web can be applied very precisely onto the workpiece surface. When varying the temperature and/or varying the pressure from pressure means to pressure means it is further possible to obtain a particularly gentle application of the material web.

According to a preferred embodiment at least one energy source is arranged in the area of the pressure means or acts in this area and is so configured that it heats the pressure means preferably to an activation and/or processing temperature of 100° C. to 200° C. In a particularly preferred embodiment, the pressure means is a heated roller. In this manner, it is possible to obtain a particularly uniform temperature distribution in the pressure means and a uniform, efficient temperature input into the material web.

This preferred embodiment has the further advantage that it allows both the coating by means of the inline and the offline method. Thus, the above-mentioned advantages of the inline method may be exploited and/or the following advantages of the offline method. For example, the offline method has the advantage that the process chain can be simplified because the application of the adhesive layer and the application of the material web onto the workpiece surface do not to occur in the same processing step. This interrupted process chain is less prone to errors, for example failure of the adhesive applicator device. Thus, already pre-treated material webs are used in the offline method, which possibly simplifies other processing steps prior to the application of the material web onto the workpiece. These include for example cutting or printing the material web.

According to a preferred embodiment an adhesive applicator device is arranged upstream of the pressure means, preferably downstream of the deflector means. The adhesive applicator device preferably comprises a nozzle for applying an adhesive layer to the material web. The adhesive applicator device is configured so as to allow application of small quantities of adhesive, preferably of below 30 g/m². The small quantities of adhesives allow the material web to lie very closely against the workpiece surface. Nozzles are particularly suitable for this purpose because they allow a uniform application of liquid adhesive in small quantities. Further, the low quantities applied combined with the properties of the adhesive allow guiding and deflecting the material web on the side covered with adhesive.

According to a further preferred embodiment of the present invention, between the adhesive applicator device and the pressure means there is arranged a cooling device, in particular a hollow shaft, in the surface of which holes are formed so that the hollow shaft is permeable from an access opening through to the surface. The hollow shaft allows to expel air which is fed into the hollow shaft through the access opening through the holes in its surface. Thus, the adhesive layer can be cooled one more time, shortly after its application onto the material web. The ventilation of the material web is preferably effected on the side of the adhesive layer. By means of the cooling device the necessary cooling line for the material web can be shortened, making it possible to obtain a more compact configuration of the device and lower space requirements. Further, due to the shorter transport time needed, a faster process cycle is possible.

According to a preferred embodiment of the present invention, a displaceable deflector means is supported preferably perpendicularly to the workpiece surface in an automatically and/or manually displaceable manner so that it allows to change the wrap angle from preferably 135° to 225°. Through the size of the wrap angle the energy input via the pressure roller into the material web or the adhesive layer can be modified. A larger wrap angle means a larger contact area of the material web on the pressure roller and, thus, a larger heat transfer from the pressure roller to the material web. Through the wrap angle it is thus possible to exactly adjust the activation of the adhesive layer. The deflector means is preferably arranged relatively to the pressure means in such manner that the material web comes into contact with the displaceable deflector means via the adhesive layer.

Preferably, direct energy sources, preferably hot air, plasma, ultrasound, microwave, infrared and/or laser sources, or indirect energy sources, preferably heated bodies such as shoes, rollers and/or drums may be employed as energy sources within the device. Preferably focused halogen light sources are also conceivable, for example. The direct energy sources have the advantage of an attitude-tolerant energy transfer, that is the energy transfer is easily possible even if the attitude (position) of the material web is changed, for example due to a change in material. The direct energy sources have the advantage that a functional integration of energy source and deflection or guiding of the material web can be realised. They further allow a better storage of energy and, thus, lower temperature oscillations. Further, with them the energy transfer is less susceptible to external influences such as draft. Preferably, an oil heating having heating rugs is used, which lowers the electrical power requirements of the machine and allows a lower electrical connection rating.

In a further embodiment of the device for coating a workpiece surface the device further comprises a printing device arranged upstream and/or downstream of the pressure means and configured to print at least a portion of the workpiece.

This embodiment has the particular advantage that a high degree of product variety is possible in the production of the coated workpiece surface. Moreover, a uniform material web may be employed for a multitude of differently designed surfaces since the final appearance of the material web is generated only during the application web onto the workpiece surface or shortly before that. For example, a single material web may be printed in different ways according to customers' wishes one after the other without the necessity to interrupt the coating of the workpiece.

By means of the method, it is possible to handle the material web shortly after the application of the adhesive also on the side of the adhesive application. The cooling conveyor lines can be shortened. Thus, it is possible to perform the method in a very compact space. Further, the material web coated with the adhesive can be stored, since the adhesive does not block and is reactivated in the subsequent coating process. The duration after the application of the adhesive can also be longer.

BRIEF DESCRIPTION OF DRAWINGS

The invention will be explained in the following in more detail by means of embodiments and referring to the enclosed drawing figures.

DETAILED DESCRIPTION OF PREFERRED EMBODIMENTS

Figure 1:
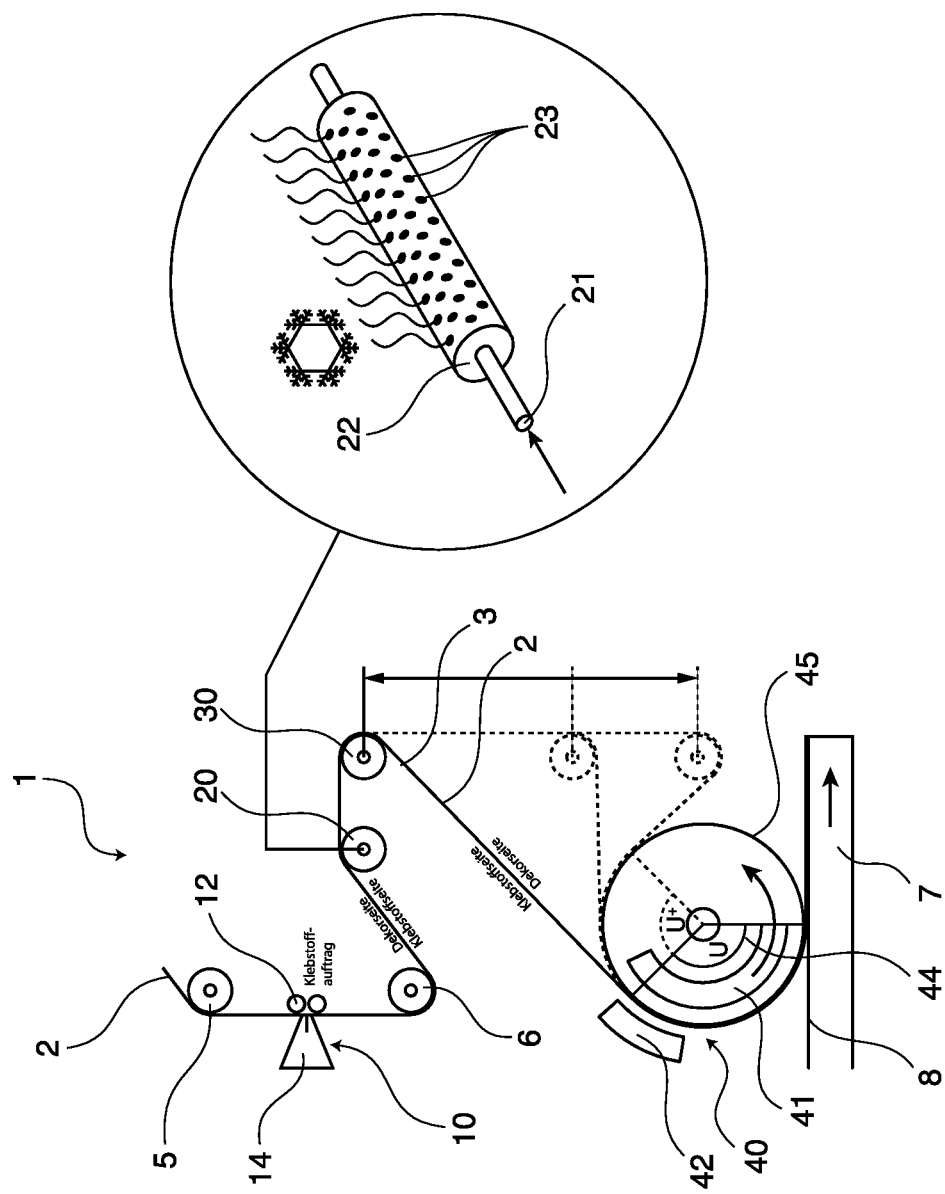
FIG. 1 shows a schematic view of an embodiment of the device for coating a workpiece in the off-line method.

FIG. 1 shows a schematic view of an embodiment of the device 1 for coating a workpiece 7.

A material web 2 is fed to the device 1 for coating a workpiece 7 coming from above in the figure in order to be applied onto the workpiece 7 arranged in the lower part of the figure. In this embodiment, the material web 2 is continuously applied onto the workpiece 7 which is moved from left to right in the figure.

Within the framework of the invention, the material web may for example be provided as endless web or in form of sections. Further, within the framework of the invention, the material layer may for example be provided as a plane (two-dimensional) element or as (edge) strip. Here, the material web may be completely or partially pre-coated with an adhesive and/or be provided with the adhesive only within the device.

The device 1 comprises deflector means 5, 6, 30, in this embodiment in form of deflector rollers, which serve the purpose to guide and direct the material web 2. Downstream of the deflector means 5, 6, 30 a pressure means 40 is arranged, which in this embodiment is configured as pressure roller, in order to apply the material web 2 onto the surface 8 of the workpiece.

The workpiece surface may, for example, be a narrow or wide surface, but also any other type of surface.

An adhesive applicator device 10 is provided in order to apply an adhesive layer 3 onto the material web 2. The adhesive applicator device 10 comprises in this embodiment a glue applicator means, in particular a nozzle 14 for applying the adhesive layer 3. A guide means 12 serves to adjust the attitude (position) of the material web 2. The adhesive applicator device 10 allows the application of small amounts of glue of below 30 g/m$^2$.

The adhesive means is, within the framework of the invention, preferably a thermoplastic adhesive, in particular hot-melt glue. It may also be an adhesive which initially is thermoplastic, and for example changes its properties during activation or re-activation and become for example thermosetting.

Between the adhesive applicator device 10 and the pressure means 40 there is a cooling device 20, which in this embodiment is configured as hollow shaft. The hollow shaft 20 is shown again in enlarged detail at the right-hand side of FIG. 1. The hollow shaft 20 comprises holes 23 in its surface 22 so that the hollow shaft 20 is configured to the permeable from an access opening 21 through to the surface 22. The hollow shaft 20 thus allows to expel air fed through the access opening 21 into the hollow shaft 20 through the holes 23 in its surface 22. Thereby, the adhesive layer 3 may be cooled again after its application onto the material web 2. The ventilation of the material web 2 is effected from the side of the adhesive layer.

In this embodiment there are provided two energy sources 41, 42 for heating the material web 2. One energy source 42 is provided outside of the pressure roller 40 and one further energy source 41 in provided within the pressure roller 40. According to the invention it is of course possible to provide only one of both energy sources in the device 1 for coating a workpiece 7. The energy sources 41, 42 comprise a point of action located in the region of the pressure means 40. In this embodiment, the point of action contacts the material web 2 at least in portions. Thus, the material web may be heated and the adhesive, in this embodiment present on the material web, may be activated.

According to this embodiment, in the device 1 for coating a workpiece 7 the deflector means 30 is arranged to be relocatable, in particular displaceable, and may preferably be relocated perpendicularly to the workpiece surface 8. Such a relocatable deflector means 30 allows the adjustment of the wrap angle 33, that is the angle at which the material web 2 lies against the pressure roller 40. In this embodiment, an adjustable angle of 135° to 225° is possible. The size of the wrap angle 44 allows to change the energy input across the pressure roller 40 into the material web 2 or the adhesive layer 3. Thus, the activation of the adhesive layer 3 may be precisely adjusted.

Although the present invention has been described here by means of a preferred embodiment, it is not limited thereto but maybe modified in various ways.

Figure 2:
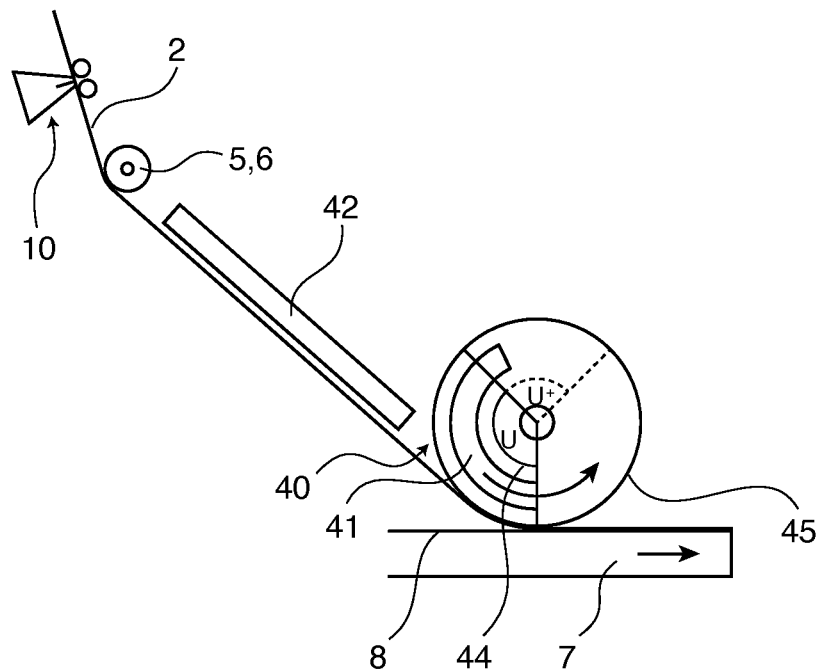
FIG. 2 shows a schematic view of an embodiment of the device for coating a workpiece in the in-line method.

In contrast to FIG. 1, in which the application of the material web 2 onto the workpiece surface 8 of the workpiece 7 is preferably effected by means of the offline methods, FIG. 2 shows a device for applying a material web 2 onto workpiece 7 by means of the inline method. Here, the material web 2 is at first fed to an adhesive applicator device 10 in which, as already described above, an adhesive layer 3 is applied on the side of the material web 2 which faces the workpiece 7 when applying the material web onto the workpiece surface 8. If necessary, deflector means 5, 6 may be integrated into the device 1.

In order to keep the temperature of the applied adhesive layer 3 within a range which ensures activation of the adhesive layer 3, the material web is guided along at least one energy source 41, 42. The energy source may be provided in the pressure means 44 and/or as shown in FIG. 2, by means of an energy source 42 arranged along the material web2. Here, it is possible to change the energy input into the adhesive layer by controlling the processing speed and/or by adjusting the intensity of the energy source 41, 42.

Figure 3:
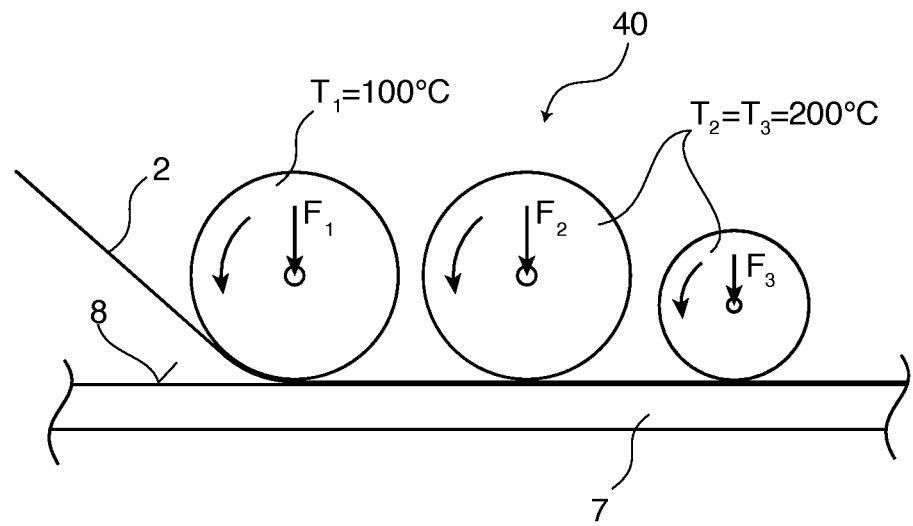
FIG. 3 shows a schematic view of an embodiment of the device having additional pressing rollers.

FIG. 3 shows by way of example a detailed view of the pressure means in an embodiment comprising three pressure means. In this embodiment, the pressure means are configured as pressure rollers, wherein the first pressure roller has a temperature of 100° C. and the second and third pressure rollers each have a temperature of 200° C. However, it is possible to also adjust different temperatures of the three rollers which heat the adhesive layer on the material web to 100° C. to 250° C. or keep its temperature in that range. Equally, the pressure means 14 may be configured so as to vary the pressing force from pressure means 40 to pressure means 40 when applying the material web 2 onto the workpiece surface 8. By varying the pressing force and/or temperature of the pressure means 40 it is possible to obtain a particularly high quality due to a production parameter adapted to the workpiece 7 and/or the material web 2.

The invention claimed is:

1. A device for coating a workpiece, comprising at least one deflector means for feeding a material web, a pressure means arranged downstream of the at least one deflector means, the pressure means operable to apply the material web onto a surface of the workpiece, at least one energy source arranged proximate to a region in which the pressure means contacts the material web, the energy source operable to transfer energy to the material web, and an adhesive applicator device arranged upstream of the pressure means and downstream of at least one deflector means, the adhesive applicator device operable to apply an adhesive to the material web, wherein:

a displaceable deflector means is supported to be displaced perpendicularly to a workpiece surface in an automatic and/or manual manner, the displaceable deflector means operable to adjust a wrap angle between the material web and the pressure means and thereby vary the amount of energy transferred from the energy source to the material web, wherein the perpendicularly displaceable deflector means is also disposed on an adhesive application side of a material web feeding path so that the material web comes in contact with the displaceable deflector means through the adhesive.

2. The device for coating a workpiece surface according to claim 1, wherein the pressure means are heatable with temperatures increasing in the downstream direction.

3. The device for coating a workpiece surface according to claim 1, wherein the at least one energy source is arranged in the region of the pressure means and is configured to heat the pressure means to an activating and/or processing temperature of 100° C. to 250° C.

4. The device for coating a workpiece surface according to claim 1, 2 or 3, wherein the adhesive applicator device comprises a nozzle for applying the adhesive onto the material web and is configured so as to allow applying low amounts of adhesive, preferably of below 30g/m².

5. The device for coating a workpiece surface according to claim 4, wherein a cooling device is arranged downstream of the adhesive applicator device and upstream of the pressure means, the cooling device being a hollow shaft having a surface including a plurality of holes extending from an access opening in the cooling device through to the surface of the cooling device.

6. The device for coating a workpiece surface according to claim 1, wherein the wrap angle is adjustable from 135° to 225°.

7. The device for coating a workpiece surface according to claim 1, wherein the at least one energy source is a direct energy sourceselected from the group consisting of hot air, plasma, ultrasound, microwave, infrared and/or laser sources, or an indirect energy source selected from the group consisting of induction, heated bodies such as shoes, cylinders, and/or rollers.

8. The device for coating a workpiece surface according to claim 1, wherein the device further comprises at least one printing means which is arranged upstream and/or downstream of the pressure means and is configured to print at least a portion of the workpiece.

9. The device for coating a workpiece surface according to claim 1, wherein the adhesive is applied to the material web within the device.

* * * * *